(12) United States Patent
Riedl

(10) Patent No.: US 12,265,939 B2
(45) Date of Patent: Apr. 1, 2025

(54) SYSTEMS AND METHODS FOR GENERATION AND TRAVERSAL OF A SKILL REPRESENTATION GRAPH USING MACHINE LEARNING

(71) Applicant: Skillscape Analytics LLC, Boston, MA (US)

(72) Inventor: Christoph Riedl, Boston, MA (US)

(73) Assignee: Skillscape Analytics LLC, Boston, MA (US)

(*) Notice: Subject to any disclaimer, the term of this patent is extended or adjusted under 35 U.S.C. 154(b) by 124 days.

(21) Appl. No.: 17/460,548

(22) Filed: Aug. 30, 2021

(65) Prior Publication Data

US 2022/0374812 A1   Nov. 24, 2022

Related U.S. Application Data

(60) Provisional application No. 63/192,375, filed on May 24, 2021.

(51) Int. Cl.
| | |
|---|---|
| *G06Q 10/0639* | (2023.01) |
| *A63B 24/00* | (2006.01) |
| *G09B 19/00* | (2006.01) |

(52) U.S. Cl.
CPC ... *G06Q 10/06398* (2013.01); *G06Q 10/06393* (2013.01); *A63B 24/0062* (2013.01); *G09B 19/0038* (2013.01)

(58) Field of Classification Search
None
See application file for complete search history.

(56) References Cited

U.S. PATENT DOCUMENTS

| | | |
|---|---|---|
| 9,832,159 B1 | 11/2017 | Kursun et al. |
| 9,852,132 B2 | 12/2017 | Chhichhia et al. |
| (Continued) | | |

FOREIGN PATENT DOCUMENTS

| | | |
|---|---|---|
| WO | 2020003325 | 1/2020 |
| WO | 2020168383 | 8/2020 |

OTHER PUBLICATIONS

Sedrakyana, "Guiding the choice of learning dashboard visualizations: Linking dashboard design and data visualization concepts," 2019, Journal of Computer languages, vol. 50, pp. 19-38 (Year: 2019).*

(Continued)

*Primary Examiner* — Ivan R Goldberg
(74) *Attorney, Agent, or Firm* — Caldwell Intellectual Property Law

(57) ABSTRACT

Systems and methods for generation and traversal of a skill representation graph using machine learning is provided. The system includes a computing device configured to receive a plurality of data of a plurality of individuals including individual skill levels corresponding to a common skill of a plurality of common skills. The computing device determines a relative skill level of the plurality of individuals from the plurality of data and generate a skill representation graph representing a plurality of skill interrelations. Generating the graph further includes generating a plurality of nodes representing a skill, generating a plurality of interconnections representing a process and/or path to master a subsequent skill of a first skill, generating the plurality of interrelations as a function of at least the plurality of data and a machine-learning model, and assembling the graph. The system finally includes a user device configured to display the skill representation graph.

16 Claims, 9 Drawing Sheets

(56) References Cited

U.S. PATENT DOCUMENTS

| | | | |
|---|---|---|---|
| 10,462,255 B2 | 10/2019 | Schissel et al. | |
| 10,754,899 B2 | 8/2020 | Murray et al. | |
| 10,902,061 B2 | 1/2021 | Chen et al. | |
| 2009/0276231 A1* | 11/2009 | Bazigos | G06Q 10/105 |
| | | | 705/320 |
| 2011/0177483 A1* | 7/2011 | Needham | G09B 7/00 |
| | | | 434/322 |
| 2013/0218620 A1* | 8/2013 | Liu | G06Q 10/06 |
| | | | 705/7.14 |
| 2016/0133162 A1* | 5/2016 | Contractor | G09B 19/00 |
| | | | 434/238 |
| 2016/0180248 A1 | 6/2016 | Regan | |
| 2016/0292248 A1 | 10/2016 | Garcia | |
| 2017/0039868 A1* | 2/2017 | Okumura | G09B 19/0038 |
| 2017/0061550 A1* | 3/2017 | Lin | G06Q 50/01 |
| 2017/0365022 A1 | 12/2017 | Corcoran et al. | |
| 2019/0009133 A1* | 1/2019 | Mettler May | A63B 24/0062 |
| 2019/0340945 A1* | 11/2019 | Malhotra | G06Q 50/2057 |
| 2020/0104960 A1 | 4/2020 | Weng | |
| 2020/0242714 A1 | 7/2020 | Doti et al. | |
| 2020/0342409 A1 | 10/2020 | Jang | |
| 2020/0394615 A1* | 12/2020 | Sethre | G06Q 10/1053 |
| 2022/0208018 A1* | 6/2022 | Khazaeni | G06N 5/02 |

OTHER PUBLICATIONS

Umemoto, "Toward Recommendation for Upskilling: Modeling Skill Improvement and Item Difficulty in Action Sequences," 2020 IEEE 36th International Conference on Data Engineering, pp. 169-180 (Year: 2020).*

Fareri, Silvia; Melluso, Nicola; Chiarello, Filippo; Fantoni, Gualtiero, Skillner: Mining and mapping soft skills from any text, Dec. 31, 2021.

* cited by examiner

SYSTEMS AND METHODS FOR GENERATION AND TRAVERSAL OF A SKILL REPRESENTATION GRAPH USING MACHINE LEARNING

CROSS-REFERENCE TO RELATED APPLICATIONS

This application claims the benefit of priority of U.S. Provisional Patent Application Ser. No. 63/192,375, filed on May 24, 2021, and titled "SYSTEMS AND METHODS FOR GENERATION AND TRAVERSAL OF A SKILL REPRESENTATION GRAPH USING MACHINE LEARNING," which is incorporated by reference herein in its entirety.

FIELD OF THE INVENTION

The present invention generally relates to the field of artificial intelligence. In particular, the present invention is directed to systems and methods for generation and traversal of a skill representation graph using machine learning.

BACKGROUND

Low levels of physical activity among young adults remain a serious nationwide problem, representing the leading modifiable risk factor leading to cardiovascular disease, diabetes, overweight and obesity, cancer, depression, and similar consequences. However, prevention and rehabilitation programs aiming to increase physical activity often lead only to short-term effects. Long-term effects, if they occur at all, are disappointing and fail to preserve patient's health in a sustainable manner. Furthermore, interventions that are more effective at improving physical activity levels are typically difficult to scale up to the community or higher population level and may be plagued by inequitable access among sociodemographic groups.

SUMMARY OF THE DISCLOSURE

In an aspect a system for generation and traversal of a skill representation graph using machine learning is provided. The system includes a computing device that is configured to receive a plurality of data of a plurality of individuals, wherein the plurality of data comprises a plurality of individual skill levels corresponding to a common skill of a plurality of common skills. The computing device is further configured to determine a relative skill level of the plurality of individuals from the plurality of data and generate a skill representation graph representing a plurality of skill interrelations as a function of the relative skill level. Generating the graph further includes generating a plurality of nodes wherein each node represents a skill, generating a plurality of interconnections wherein each interconnection represents a process and/or path to master a subsequent skill of a first skill, generating the plurality of interrelations as a function of at least the plurality of data and a machine-learning model, and assembling the graph using the plurality of interrelations. The system finally includes a user device configured to display the skill representation graph as a function of the computing device.

In another aspect a method for generation and traversal of a skill representation graph using machine learning is provided. The method includes receiving, by a computing device, a plurality of data of a plurality of individuals wherein the plurality of data comprises a plurality of individual skill levels corresponding to a common skill of a plurality of common skills, determining a relative skill level of the plurality of individuals from the plurality of data, generating a skill representation graph representing a plurality of skill interrelations as a function of the relative skill level. Generating the graph further comprises generating a plurality of nodes wherein each node represents a skill, generating a plurality of interconnections wherein each interconnection represents a process and/or path to master a subsequent skill of a first skill, generating the plurality of interrelations as a function of at least the plurality of data and a machine-learning model, and assembling the graph using the plurality of interrelations. The method further includes displaying, by a user device, the skill representation graph as a function of the computing device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
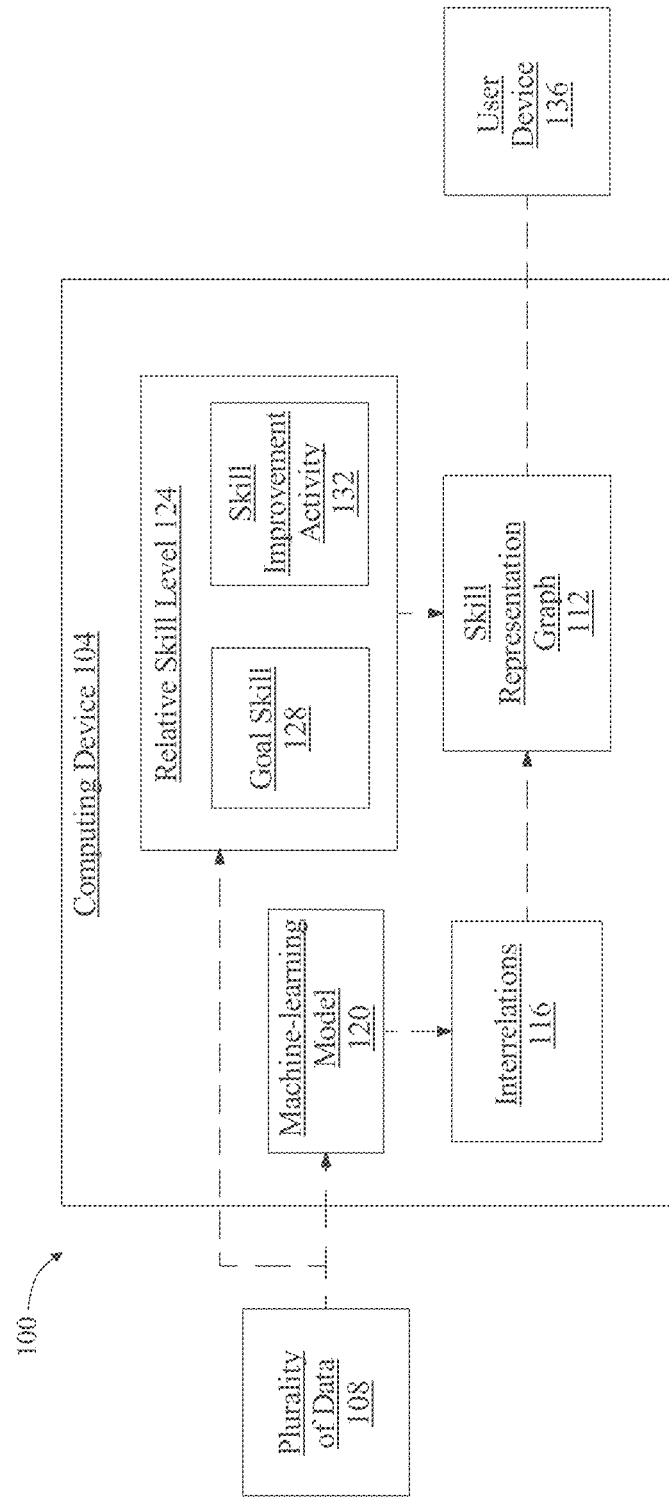
FIG. 1 is a block diagram illustrating an exemplary embodiment of a system for generation and traversal of a skill representation graph using machine learning.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for generation and traversal of a skill representation graph using machine learning. In some embodiments, the systems and methods using a computing device that is configured to receive a plurality of data of representing individual skill levels of a common skill to be considered in the generating of the skill representation graph is provided. Exemplary embodiments illustrating aspects of the present disclosure are described below in the context of several specific examples.

There is a strong need to develop delivery methods for physical activity interventions and/or training in recreational or elite sports that provide equitable access across sociodemographic groups and can be scaled to the population level. One vision is to leverage now ubiquitous smart phone technology to deliver data-driven personalized activity interventions that promise not only to engage the user in fitness-enhancing activities and habits, but also to reduce cost and increase access across the population, including disadvantaged groups. The potential for smartphone technology to provide solutions in this domain is obvious, but attempts to leverage its power and reach have been hampered by two significant factors: (1) despite recent advances in technology, such as wearable activity trackers, activity programs and workout regimes, are still mostly standardized, mechanistic routines unaccommodating of individual differences; and (2) technological interventions typically target individuals, not fully recognizing the role of social connections in motivating behavior change, and therefore not providing interventions that leverage the power of social influence that the widespread use of smartphones makes available.

Aspects of the present disclosure can include embodiments utilizing machine-learning methods to generate a graph relating a variety of common skills to one another, variety of nodes representing such skills, and edges between nodes that represent possible avenues in which a user can proceed into developing and/or improving a subsequent skill. Some embodiments disclosed herein model "social contagion" of physical activity. Embodiments may develop a data- and AI-driven personalized training framework, which may act as a virtual coach. Embodiments disclosed herein may be used to develop individual- and group-based interventions and test behavioral theories in two randomized controlled experiments.

The promise of AI for virtual coaching has been noted, but little progress toward this goal has been made. For instance, personalized predictive models that could serve as the basis for truly personalized, adaptive workout recommendations are still lacking. Embodiments disclosed herein may address the challenge to deliver skill training via an AI coach using computational methods to dynamically characterize skill profiles. A resulting framework may allow for adaptive, personalized workout programs, which may, for instance, recommend training goals and/or corresponding exercises, facilitate matching of training partners, perform intensity prediction for workload injury prevention, injury rehabilitation, and/or other application scenarios that rely on measurement of similarity between participants, exercises, and skills. This form of virtual coaching may extend far beyond existing systems that provide simple coaching like encouragements and notifications.

Aspects of the present disclosure can be used to inform a user about the user's progress in improving a skill and various physical and/or intellectual exercises to improve current achievements. A user can be informed and continuously monitor the user's progress via a user device where the user can view a visual or graphical representation with a certain level complexity and detail to facilitate self-monitoring. This is so that a user can be motivated to continue self-monitoring and perform to achieve improvements of exercises and skills through the visual representation of progress rather than through simple sentences or texts highlighting such achievements and goals.

Referring now to FIG. 1, an exemplary embodiment of a system 100 for generation and traversal of a skill representation graph using machine learning, which may include neural networks is illustrated. System 100 includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device. Processes described in this disclosure may be implemented using any suitable network and/or service architecture including, without limitation, using thin-client, thick-client, and/or "cloud" architectures.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive a plurality of data 108 representing relative skill levels of a plurality of individuals, who may include any population of individuals with regard to whom data is collected as described in this disclosure. A "skill level," as used in this disclosure, refer to a quantitative measure of ability an individual has with regard to a skill, which may include any skills described in this disclosure. Plurality of skill levels include a plurality of individual skill levels corresponding to each individual of plurality of individuals and skill levels may be collected in any manner and/or form as described herein. Each individual skill level may correspond to a common skill. A "common skill," for the purposes of this disclosure, is a skill the evaluation of which is common to a population of individuals, such as a particular rock-climbing skill as described in further detail below, and with regard to which each individual's skill level may be measured and/or evaluated against a skill level of each other individual. There may be a plurality of common skills, such as without limitation skills employed in rock climbing endeavors and/or problems as described in further detail below. The plurality of common skills may be stored in a database.

With continued reference to FIG. 1, the plurality of data 108 may relate to skill-based activities such as without limitation indoor rock climbing. Other examples of skill-based activities may include skateboarding, snowboarding, gymnastics, diving, figure skating, judo, combat sports such as mixed martial arts (MMA) and fencing, strategic game skills such as abilities in chess, go, or the like, as well as any other skills that may occur to a person skilled in the art having the benefit of the entirety of this disclosure. About one third of all Olympic sports may fall into this category, the remainder being about one third team-based ball games and one third athletics. Data science methods and/or AI methods employed as described in this disclosure may be generic and/or may generalize to all skill-based activities with discrete movement patterns such as activities with specific "figures" or "tricks". In some embodiments, and as described in further detail below, workouts may be recorded on a smartphone application or "app," or other program operating on a portable computing device 104, making methods disclosed herein potentially equally applicable to indoor and outdoor activities. Population and/or plurality of data 108 may come from users of client devices and/or applications thereon, such as without limitation smartphone apps through which participants may, in a non-limiting example, record their workouts as they exercise on climbing walls installed in climbing gyms and community centers across a geographic region such as the U.S. Overall. In other words, collection of plurality of data 108 may be crowd sourced.

With continued reference to FIG. 1, the plurality of data 108 may include a description of at least an activity of an individual performing at least one common skill wherein a common skill may include any common skills described in the entirety of this disclosure. The plurality of data 108 may further include a plurality of activities describing a common skill of the plurality of common skills. The plurality of activities may include any activity described in the entirety of this disclosure. In a non-limiting embodiment, an activity may consist of a variety of physical exercises, movements, and the like, that may enhance the improvement of a common skill. The plurality of data 108 that may include a plurality of activities and a corresponding description of at least the activity and an individual performing such activity may be organized into training data sets and stored and/or retrieved by computing device 104, without limitation, as a relational database, a key-value retrieval database such as a NOSQL database, or any other format or structure for use as a database that a person skilled in the art may recognize as suitable upon review of the entirety of this disclosure. The plurality of data 108 training data may alternatively or additionally be implemented using a distributed data storage protocol and/or data structure, such as a distributed hash table and the like. The plurality of data 108 training data may include a plurality of data entries and/or records, as described above. Data entries may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries of the plurality of data 108 may be stored, retrieved, organized, and/or reflect data and/or records as used herein, as well as categories and/or populations of data consistent with this disclosure.

Still referring to FIG. 1, plurality of data 108 may combine (i) dynamic networks of participants who train together with (ii) rich training histories for each individual, and/or (iii) robust and precise attributes of exercises they complete such as difficulty level, number of attempts needed to complete the exercise successfully, style of the exercise, match between an exercise and a participants training profile, which match may be based on machine learning embeddings, or the like. Plurality of data may provide repeated network observations and repeated outcome measures; for instance Jim may work out with Emily in one week and then with Alicia and Tom the following week. Such correlations may be used as training data and/or training examples as described in further detail below.

Continuing to refer to FIG. 1, plurality of data 108 may include a plurality of elements that are measured. Elements may include measures of individual-level ability, for instance as determined based on a moving average of the 10 most difficult exercises completed in the past 12 months. Utilization of a moving window may be used to account for the fact that ability fluctuates with cycles of training stress and periodization. Computing device 104 may collect and/or construct data representing a network of session-level peer groups based on records of individuals completing the same exercises, in the same gym, within a 5-minute interval. If two individual recorded completing the same exercise within this time window, collection of data may be performed under the assumption that such persons were working out together, or at least were aware of each other's presence, and that there is thus a plausible pathway of social influence. Preliminary analysis suggests that the majority of simultaneous exercise records happens within less than 5 minutes. Based on the constructed workout-level networks it may be possible to construct key predictor variables: (a) binary indicator of group vs. solo workout; (b) group size; (c) average ability of peer group members (excluding ego), and (d) relative performance rank in a peer group based on individual ability and average ability of peer group members. Data may include measures of training volume as a number of exercises completed in a single workout. Data may measure performance as a difficulty of a completed exercise, for instance and without limitation based on community consensus rating; on average, exercises may have 15.3 difficulty ratings. Data may measure secondary outcomes relating to learning and growth; to assess learning and growth, data and/or computing device 104 may measure a similarity between a completed exercise at time t and a training profile of a particular individual at a time t using cosine similarity between an embedding of the individual and an embedding of the exercise, for instance using embeddings and/or vectors as described in further detail below. Computing device 104 may receive self-assessments conducted by individuals. IN a non-limiting embodiment, self-assessment may include quantitative measurements for internal and external workload for the individual.

With continued reference to FIG. 1, the computing device 104 may include a plurality of sensors that may be mechanically coupled to a wearable computer. "Sensor," for the purposes of this disclosure, refer to any device, module, and/or subsystems, utilizing any hardware, software, and/or any combination thereof to detect events and/or changes in the instant environment and communicate the information to at least a computing device and at least a wearable computer. A person of ordinary skill in the art reviewing the entirety of this disclosure would appreciate the context of detecting events and/or changes off an environment in the context of bodily health. "Wearable computer," for the purposes of this disclosure, refer to a computing device for the use of mobile computing. In a non-limiting embodiment, system 100 may include a wearable computer with various sensors that may be specialized for the purposes of fitness tracking and capture the plurality of data 108 to be transmitted to the computing device 104 for further computing. A sensor from the plurality of sensors may be used to monitor the status of an individual's health. Wearable computer may incorporate, but not limited to, special sensors such as accelerometers, thermometer, pedometers, and heart rate monitors, or novel user interfaces such as an optical head-mounted display controlled by gestures. In a non-limiting embodiment, computing device 104 may incorporate artificial intelligence into a machine-learning model for evaluating and measuring skill captured by a wearable computer or the computing device 104 itself. The system 100 may be further configured to support the monitoring of internal and external workload of an individual. In a non-limiting embodiment, the computing device 104 may conduct various surveys including questionnaires in which an individual may complete and the computing device 104 may then use a machine-learning model and/or artificial intelligence to evaluate incoming training data for the generation of interrelations 116 or the generation of relative skill level 124.

Still referring to FIG. 1, computing device 104 is configured to generate a skill representation graph 112 representing a plurality of skill interrelations 116. A "skill interrelation," as used in this disclosure, is a quantitative measure of a degree of effort required for a person possessing a first skill level relating to a first skill to develop a second skill level relating to a second skill, where effort may be measured, without limitation, in hours of practice, likelihood of improvement in the second skill, or the like. In some embodiments, generating plurality of skill interrelations 116 may include generating the plurality of skill interrelations 116 as a function of the plurality of data 108 and a machine-learning model 120. Machine-learning model 120 may include a configuration of a neural network. Machine-learning model 120 may include any machine-learning model as described in further detail below and may be trained using plurality of data 108 as training data as described in further detail below. For instance, and without limitation, computing device 104 may train and/or utilize a neural network as described in further detail below. The plurality of skill interrelations 116 may incorporate the use of revealed comparative advantage (RCA). Training may be performed using RCA as discussed in further detail below.

Still referring to FIG. 1, skill representation graph 112 is generated by generating a plurality of nodes, generating a plurality of interconnections, and generating a plurality of interrelations. Computing device 104 assembles skill representation graph 112 using plurality of interrelations. In an embodiment, each node of skill representation graph 112 may represent a skill wherein the skill may include any skill described in the entirety of this disclosure. An edge connecting two nodes of a skill representation graph 112 may represent a skill interrelation between two skills represented by the two nodes; where skill interrelation requires greater than a threshold effort to advance from a first skill to a second skill, and/or where path traversing additional nodes represents interrelations having an aggregate or node-to-node degree of difficulty easier by some threshold amount than a direct interrelation between the first skill and the second skill, no edge may be constructed between the first skill and the second skill. In other words, edges of skill representation graph 112 may represent realistic paths for progression from one skill to another. In an embodiment, lengths of edges may represent quantities of skill interrelations 116. For instance, a long skill representation graph 112 edge may represent a greater degree of difficulty in proceeding from one skill to another, while a smaller edge may represent a lesser degree of difficulty. A person of ordinary skill in the art and in view of the entirety of this disclosure would appreciate the skill representation graph and further representations of the nodes and interconnections in the context of progression in view of activities and skills. The generating of the skill representation graph 112 may include the use of neural networks as described in the entirety of this disclosure.

Still referring to FIG. 1, nodes of skill representation graph 112 may be clustered together about one or more centroids representing sets and/or clusters of nodes that are closely interrelated as measured by skill interrelations 116. There may be multiple such centroids; for instance, and without limitation, a number of nodes representing beginning or introductory skills may be closely clustered, indicating, for instance, a relatively unspecialized set of fundamental rock-climbing or other skills. Latent dimensions and/or centroids may or may not have semantic meaning and/or one or other elements of meaning within a context of a phenomenon and/or system to be modeled. Other nodes representing more advanced skills may be relatively distant from one another, indicating relative difficulty in progressing from one advanced skill to the next. Nodes and edges of skill representation graph 112 may represent typical or general skill interrelations 116 across a population of individuals; nodes and edges' positions and lengths may be invariant from one user to another, while other indications on skill representation graph 112, such as coloration, may indicate whether a given user has mastered a skill represented by a given node, and/or to what extent mastery has occurred. In a non-limiting example, and continuing to refer to FIG. 1, computing device 104 may first construct a heterogeneous network of participants, exercises, skills, and skill attribute nodes by linking participants to exercises the participants have recorded, linking exercises to skills that such exercises comprise, and characterize skills through a set of attributes. Skills may be represented through, in a non-limiting example, some number of holds arranged in an identical layout on all climbing walls of a given type. Skill attributes may include a type of climbing hold, for instance as representing a size, shape, or the like of hold, and a hold rotation such as for instance horizontal, vertical, upside-down/under cling, or the like. Computing device 104 may then compute embeddings in a latent vector space of the heterogeneous network using an algorithm such as without limitation a metapath2vec algorithm. Such embeddings may geometrically represent skill interrelations 116 hisp using vector interrelationships. Embeddings may include, without limitation, vectors. A "vector" as defined in this disclosure is a data structure that represents one or more quantitative values and/or measures. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes.

In embodiments, and still referring to FIG. 1, neural network-based learning models may represent latent embeddings that capture the relations of rich, complex data. Representing complex data of human behavior as a network for instance as a skill representation graph 112, may be used to express data as a "social language." This then means that recent advances in natural language processing may be naturally applied to network representation learning, such as without limitation a group of NLP models known as word2vec. Recent research has proposed word2vec-based network representation learning frameworks, such as DeepWalk and node2vec. A key advantage of these methods may be that they do not rely on handcrafted network feature design but instead may enable automatic discovery of useful and meaningful (latent) features from "raw networks."

Continuing to refer to FIG. 1, computing device 104 may construct skill representation graph 112 using the following steps: (1) computing device 104 may compute pairwise cosine similarity or other distance measure of embeddings between all nodes representing skills; (2) computing device 104 may construct weighted network using skill-skill similarity and/or skill interrelations 116 as edge weights; (3) computing device 104 may extract a network backbone by pruning network to a threshold of minimum skill similarity and/or skill interrelation quantity, for instance and without limitation as described above; and (4) computing device 104 may perform community detection to identify distinct clusters of complementary skills. A resulting skill representation graph 112 may reveals a topology of skill complementarity such that visually close skills exhibit high skill complementarity. Skill representation graph 112 may be displayed to indicate skills, skill interrelations, personal skill attainment, recommended future skills to be acquired, or the like, as described in further detail below; display may include display on a user device such as a smartphone, tablet, or the like.

Still referring to FIG. 1, once a network representation has been learned—in other words, embeddings for network nodes have been computed in a latent vector space—a variety of recommender applications may be built on top of it. These recommender applications may measure similarity and/or dissimilarity of latent embeddings of two nodes for instance and without limitation using cosine similarity. In some embodiments, instead of selecting edges to include in skill representation graph 112 based on threshold levels, edge selection may be performed according to a backbone method. A backbone method may include calculation of a threshold that is specific to each node rather than global; in some embodiments, this may prevent disconnection of nodes from the skill representation graph 112 where transition from one node to another is particularly difficult. A manual process to ensure connectivity may also be employed in addition to automated processes as described herein.

Further referring to FIG. 1, in embodiments skill representation graph 112 may embed different information about synergies between skills. For instance, nodes that have more connections may be more important, the greater number of connections may indicate greater synergy and more complementarity with more other skills in the system. This may indicate that skills represented by such nodes may make good goals because acquiring those skills may have a higher return. Skill representation graph 112 may capture how a pair of skills support each other, either by the ease of simultaneously acquiring both skills, and the ability to complete exercises that require both skills. This may also be reflected in skill representation graph 112 layout: nodes closer to center, central axis, or the like may be more tightly connected with other nodes, indicating more synergies, while nodes on a periphery may represent specialized skills that do not transfer as well. Pairs of skills that are more distant (longer edges) may have less complementarity; that is, it may be harder to acquire a distant skill from a mastered skill as starting point. Network represented in skill representation graph 112 may be hierarchical. Beginner skills may not be directly connected with expert skills; a user may have to go through intermediate skills first. Skill representation graph 112 may apply Louvain community detection to reveal a hierarchy and to communicate goals to users. Hierarchical skill representation graph 112 may be used to represent the fact that skills are a hierarchy in which one cannot go from bottom to top without going through intermediate steps. Skills that are not directly connected, and/or have many steps in between, may lack sufficient complementarity such that acquiring such skills is very difficult. In an alternative embodiment, similarity such as cosine similarity of Euclidean distance from embeddings of the neural network algorithm may be used to construct such a weighted skill-skill network. Clustering and thresholding and/or backboning may be applied as before to generate connections. A further alternative that does not utilize pre-defined skills may include performing community detection or clustering on a latent space to define artificial centroids. Such centroids may then be used as nodes in skill representation graph 112, with calculation of their weighted edges through similarity in the latent space, followed by application of clustering and thresholding and/or backboning. This approach as the benefit that it could identify higher-level skills such as those extracted from semantic latent spaces. A person of ordinary skill in the art, after reviewing the entirety of this disclosure, would appreciate various components of generating a graph in the context of generating interconnections, generation nodes, and assembling of nodes and interconnections for a skill representation graph.

With continued reference to FIG. 1, computing device 104 and/or system 100 may be further configured to receive a plurality of subject data describing activities of a subject performing at least one common skill of the plurality of common skills and determine at least a relative skill level 124 corresponding to the at least one common skill. For instance, computing device 104 may compute which specific skills a participant has "acquired" and at which level of proficiency, for instance as measured on a scale from novice through elite. Computing device 104 may determine the relative skill level 124 dynamically and/or continuously while an individual is performing at least one common skill and/or at least one activity. In a non-limiting embodiment, relative skill level 124 may include a determination of at least an individual skill level as a function of an individual performing a common skill. Computing device 104 may use revealed comparative advantage to determine skills that are overexpressed in a participant. Skills acquired and extent to which such skill acquisition has occurred may be represented on skill representation graph 112, for instance and without limitation as described in further detail below. In an embodiment, above-described processes link every individual with a skill through a difficulty weighted revealed comparative advantage score (RCAW). Computing device 104 may calculate an individual's average RCAW value for each skill and indicate that any skill is "acquired" where RCAW score is above the user's mean RCAW. To determine the level of achievement, computing device 104 may calculate, for each skill, a mean difficulty of all exercises that the individual has completed that rely on that skill; this may provide a mean difficulty per individual per skill. Computing device 104 may calculate achievement level as a percentile of a given individual's difficulty, among all individuals and that skill. For the purpose of visualization, such percentiles may be converted into discrete "levels", for example, $[0^{th}$-$20^{th}[$="Level 1", $[20^{th}$-$40^{th}[$="Level 2" and so on. Similarly, a value within each level bracket may be converted into a progress bar such that, for example, $30^{th}$ percentile translates to "50% achievement in Level 2" and a progression goal "50% to go to Level 3". This may be displayed by the system to indicate progress to "level up." In some embodiments, to calculate a progress bar that shows an individual's progress toward acquiring a skill computing device 104 may calculate a percentile each users RCAW falls into. Computing device 104 may then represent all percentile values above 50% as skills the user has already acquired, while all values below 50% may be normalized to 0-100% range and thus represent progress toward acquiring each skill. In an app or other user device 136, a progress bar may be displayed based on a type of node: for skills that an individual has not acquired an "acquire progress bar" may be displayed, while, for skills the individual has acquired, a progress bar toward "leveling up" to the next level may be displayed instead. Progress bar may furnish an individual with an ability to self-monitor progress to achieve behavior change.

Continuing to refer to FIG. 1, computing device 104 and/or system may be configured to determine at least one goal skill 128 of the plurality of common skills as a function of the at least one relative skill level 124. Goal skill 128 may be used to determine an individual skill level associated with the relative skill level 124 for an individual. For instance, and without limitation, given a network of skill-skill complementarity and/or skill interrelations 116, computing device 104 may recommend one or both of two goals: a new skill to acquire, and a personal weakness to "level up." For recommendation of a new skill, computing device 104 may identify a set of skills that (a) a user has not yet acquired and (b) are connected to at least one acquired skill; such skills may be skills that are "reachable" from the individuals current skill profile. Computing device 104 may identify, within such skills, skills that (c) have higher average difficulty than average difficulty of all skills the user has acquired—in other words, skills that are on an upward trajectory from user's current status. Computing device 104 may sort a list of skills so identified by node importance, for instance as represented by degree strength in skill representation graph 112, eigenvalue centrality, or the like, and recommend the most important node. "Level up" recommendations may identify a skill node that individual has acquired with the lowest achievement level, for instance as represented using a difficulty percentile.

Still referring to FIG. 1, computing device 104 may be configured to determine at least one skill improvement activity 132 to achieve at least a goal skill 128. Skill improvement activity 132 may include any activity described in the entirety of this disclosure. One of ordinary skill in the art would appreciate, after reviewing the entirety of this disclosure, the various activities in the context of improving a skill. For instance, and without limitation, computing device 104 may be configured to recommend a top-k most relevant exercises to aid a participant in achieving a recommended goal by leveraging skill-to-exercise similarity. This may address a key challenge with learning new skills where participants are uncertain about which new skills they should focus on learning, and which exercises they should perform to achieve acquire those skills. In a non-limiting embodiment, a skill improvement activity 132 may include an activity of higher physical intensity and exhaustion representing a variation of a prior activity for a goal skill 128. Skill improvement activity 132 may at least be used to determine a relative skill level 124 of an individual.

With continued reference to FIG. 1, activity recommendations may be based on RCA scores as described above. Computing device 104 may determine a window of desired exercise difficulty based on a participant's current ability level. To ensure upward progression, a lower limit may be selected as a bit higher than a current achievement level, but an upper limit may not be too high to avoid frustrating the user with recommendations that are too difficult. Exponential adjustments may be used to account for diminishing returns as individuals get closer to their personal ability potential. For example, lower limit=percentage of difficulty$-e^{(percentage\ of\ difficult)*0.1}$ upper limit=percentage of difficulty$+e^{(percentage\ of\ difficult)*0.025}$ Computing device 104 may then select all exercises in the above-identified difficulty range, and sort exercises based on (a) how relevant the exercise is for the target goal, b) the exercise difficulty (lower is better); and (c) the exercise quality (higher is better). Relevance may be proportional to RCA score and a higher score may be better). It may be helpful to use the log(RCA) to put a dampening effect on overly specialized exercises that that rely only on the desired skill which can make it harder for users to break into new skills; a goal may be to strike a tradeoff between exercises that actually rely on a given skill but do not consist exclusively of the skill. Exercise quality may include attributes such as community user ratings, popularity (e.g., number of other who have already completed the exercise). Computing device 104 may then recommend a top-k exercises to user.

Still referring to FIG. 1, as an alternative and/or in addition to RCA scores, computing device 104 may use similarity from neural network embeddings to identify candidate exercises, and then use processes described above to pick exercises within desired window of difficulty and sort by relevance, difficulty, and/or quality. Benefits of above-described approaches may include recommendation exercises that rely on skills that are adjacent to the target goal.

With continued reference to FIG. 1, computing device 104 may summarize achievement levels of a subject according to and/or as categorized by attributes of skills, such as by grip type in the context of climbing. To do this, computing device 104 may group acquired skills by type and average achievement levels of acquired skills. Aggregate achievement levels may be shown in a radar skill representation graph 112 to give a "strengths and weaknesses" profile at a glance. Each summarized level may then become an actionable entry point for exercise recommendations; for instance, and without limitation, methods as described above may be used to determine suitable training goals within a category, or in other words to select among skills within a given category, rather than across all skills. Such within-category training goals may be used in turn to recommend exercises that match such training goals. In a non-limiting embodiment, a user may be able to utilize skills, goals, and/or recommended actions as direct entry points into a workout session; in some embodiments, this may be performed on a home screen of an application. For example, recommended exercises that match a "level up" goal may be an entry point to "work your weakness", exercises that match the "new skill" goal, may be an entry point to "grow your comfort zone and learn new skills", exercises that fit an athlete's profile, based as a non-limiting example on similarity of embeddings, may be "limit workouts that suit your style," for instance if they are difficult, or "volume workout that suit your style," if they are easy. Exercise or other activity recommendations provided "by category" may constitute another entry point.

In some embodiments, and with further reference to FIG. 1, an ability of processes and data structures as described above to determine similarity between exercises and exercises, exercises and people, people and people, exercises and skills may be used for a variety of additional applications. For instance, and without limitation, such abilities may be used to recommend a training partner based on individual-individual similarity or dissimilarity. Abilities described above may be used to measure training load and/or exercise intensity based on person-exercise similarity. For instance, and without limitation, exercises that have lower similarity with current person profile, may be more difficult, for instance as proven by our preliminary analysis that shows correlation with increased heart rate; this may be used for training load prediction and injury prevention such as overload injury. Abilities of processes and data structures as described above to determine similarity between exercises and exercises, exercises and people, people and people, exercises and skills may be recommended suitable exercises for group workouts, for instance by finding exercises that lie at an intersection of multiple users. This may also be used to determine the ideal pathway through the space of skills from a given starting position (e.g., a participant's existing skill profile) and a desired goal state (e.g., ability to complete a specific exercise). Abilities to processes and data structures as described above to determine similarity between exercises and exercises, exercises and people, people and people, exercises and skills may be used, given a target exercise, to recommend stepping-stone exercises that cover a difference between a user's current skills and those required by an exercise.

With continued reference to FIG. 1, ability level and which skills are acquired may be calculated for two different points in time such as without limitation before a current exercise is recorded and after an exercise has been recorded. Given a vector of acquired skills $eW_{t-1}$ and $eW_t$ computing device 104 may detect changes and generate notifications such as "you acquired a new skill"; similarly given a vector of achievement levels at time t−1 and t computing device 104 may generate "level up" notifications.

Still referring to FIG. 1, in some embodiments, computing device 104 may not include specific "start skills" and "finish skills" from the calculation of a landscape represented in skill representation graph 112; this may be the case where all exercises need to start somewhere and end somewhere and start and/or finish skills contain little information that differentiate those exercises. As a further non-limiting example, domain expertise about a target sport may be used to remove skills that are not useful or merge skills that are similar. For example, in application to climbing boards or walls, system may omit "footholds only" from a set of holds used in a climb or holds that are very commonly used and thus hold little information about constituent skills. In some embodiments, where a climbing wall is symmetric, all "left hand skills" may have a mirrored "right hand skill" equivalent. Consequently, a "set of all skills" may constitute half of a total set of skills. Similarly, spinning 360 degree clockwise for a right-side-dominant person may be treated as equivalent to spinning 360 degree counterclockwise for a left-side-dominant person or the like.

Still referring to FIG. 1, an advantage for embodiments described above in smart health and personalized fitness applications of an ability of representing heterogeneous networks is that nodes of different types may be embedded in the same latent space. This may allow a measurement of similarity and/or dissimilarity across node types, thus facilitating not just intra-participant or intra-exercise comparisons, but also comparisons between participants and exercises, or between exercises and skills. This in turn may allow a variety of AI-driven, personalized application scenarios such as predicting personalized training intensity based on participant-to-exercise similarity for workload injury prevention. Methodologies as described in this disclosure may enable several fully individualized exercise programs—a virtual coach-based on a match between dynamically changing profiles and demands of an exercise such as (a) identification of progressive training goals, (b) recommendation of corresponding exercises to achieve those goals, (c) prediction of personalized cardiovascular responses (heart rate) and training intensity (workload prediction), (d) recommendations of group exercises that lie at the intersection of physical fitness of two participants, and/or (e) recommendation of training partners.

Continuing to refer to FIG. 1, system 100 and/or computing device 104 may be configured to display skill representation graph 112 using a user device 136. Displaying of skill representation graph 112 may include display of one or more indicia indicating a user's current state of progress, such as indications of completed and/or mastered skills, a degree of completion achieved, one or more goal skills, or the like. For instance, and without limitation, colored nodes and edges may show skills users has at least attempted to start working on, and particular shades of colors may indicate degrees of progress. A highlighted edge to a node representing a skill a user has not yet begun to attempt, which may be represented as a white and/or colorless node, may represent a recommendation to next skill attempt. As a further non-limiting example, a node representing a weakest skill of an individual may be enlarged. As a further non-limiting example, a node representing a recommended goal skill 128 may also be enlarged. Skill representation graph 112 may include one or more skill representation graph 112 ical user interface event handlers and/or interactive features enabling a user to enter and/or receive further information. For instance, and without limitation, in some embodiments clicking on a node may cause a user device to display progress toward mastery of a skill represented by the node as a percentage of mastery of that skill.

Further referring to FIG. 1, skill representation graph 112 and other visual elements may be displayed on a user device 136, which may include any device suitable for use as computing device 104, including without limitation a portable computing device 104 such as a smartphone, tablet, or the like. User device 136 may include any wearable computer described in the entirety of this disclosure. User device 136 may include a graphical user interface (GUI). GUI may receive input from the user interacting with a computing device. Interaction of user with GUI may be through an input device. Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. GUI may receive input from user through standard I/O interface such as ISA (Industry Standard Architecture), PCI (Peripheral Component Interconnect) Bus, and the like. GUI may receive input from user through standard I/O operation. In one embodiment, GUI may further receive input from user through optical tracking of motion. In one embodiment, GUI may further receive input from user through voice-commands. GUI 104 may further use event-driven programming, where event listeners are used to detect input from user and trigger actions based on the input.

With continued reference to FIG. 1, user device 136 may include at least a display wherein the display may include an output device. "Output device", for the purposes of this disclosure, refers to a visual apparatus that is comprised of compact flat panel designs, liquid crystal display, organic light-emitting diode, or combination thereof to present visual information superimposed on spaces. Display may include a graphical user interface (GUI), multi-functional display (MFD), primary flight display (PFD), gages, dials, screens, touch screens, speakers, haptic feedback device, live feed, window, combination thereof, or another display type not listed here. In a nonlimiting embodiment, the display may include a mobile computing device like a smartphone, tablet, computer, laptop, client device, server, a combination thereof, or another undisclosed display alone or in combination. A person of ordinary skill in the art and in view of the entirety of the disclosure would appreciate the use of a user interface in the context of displaying a skill representation graph for the purpose of monitoring progress. User device 136 may further be configured to display an indicia indicating an individual's current state of progress of at least an improvement activity 132 in achieving at least a goal skill 128. In a non-limiting embodiment, user device 136 may display an upward trend of a skill representation graph that representations the achievements of a user for a skill or common skill and remaining progress to be completed to achieve a subsequent skill through the skill improvement activity 132. The user device 136 may be configured to allow for a comparison of an individual's progress, remaining progress to be completed, and/or accomplishments or failures. Failure may include any skill or activity a user has failed to complete or accomplish or any skill or activity the computing device 104 has determined a user has failed to complete or accomplish. A person of ordinary skill in the art after reviewing the entirety of this disclosure would appreciate the displaying of indicia indicating state of progress for a user in the context of skill improvement for a goal.

Still referring to FIG. 1, embodiments of system may be used to generate and/or update behavior change models based on data collected by system 100 concerning activities of users. Such models may include, without limitation, any machine-learning model as described in this disclosure. For instance, a machine-learning model may be generated using data describing user progress that identifies maximally effective recommendations for development of new skills, improvement of existing skill levels, or the like. In an embodiment, system may track interactions between users, for instance by recording which users are working out together as described above, to model how social networks interact with individual characteristics in physical activity. Models may determine and/or estimate causal social influence effects using, for instance, a network panel model; this model may allow identification of causal peer effects in panel data by leveraging a key features of the data: each individual may be observed repeatedly in multiple peer groups, including outcome observations for the behavior of interest such as exercise difficulty and performance outcomes. To address concerns about correlated effects that affect individuals in the same peer group together, such as better gym facilities improving performance of all participants visiting that gym, system may employ a complementary instrumental variable estimation. Specifically, system may instrument for quality of an environment using ability levels of all visitors to the same gym during the entire week, excluding a focal day under analysis. One or more displays, data structures, elements of data, or the like as described in this disclosure may be shared using social networking, such as without limitation using a "friends feed" as described in further detail below.

With continued reference to FIG. 1, models generated by system 100 may account for and/or reflect social cognitive theory about goals, uncertainty, and achievement. Capability, including necessary knowledge about training goals and corresponding exercises, may represent a useful aspect of a behavior change theory model. Together, a lack of appropriate goals and uncertainty about corresponding exercises may be a key driver of low motivation and ultimately non-compliance. In some embodiments, data may be collected regarding activities of users, success in achieving goal skills as described above, and degrees of compliance with recommended activities may be used iteratively to update models, neural networks, skill representation graph 112, recommendations, estimations of skill levels of users, and the like. Embodiments described above may capture participants' skill profiles based on their records of completed exercises. In some embodiments, skill representation graph 112 and/or user-specific representations thereon may not be static but may be updated dynamically as participants record additional exercises and acquire new skills. This methodology may enable recommending personalized exercise programs, training goals, and training partners based on the match between dynamically changing skill profiles and the demands of an exercise. System may develop methodology to deliver personalized interventions that support: (a) identification of personalized training goals, (b) recommendation of corresponding exercises to achieve those goals, and (c) recommendation of (virtual) training partners based on complementary (opposite) skill. Such AI-driven features function to improve self-efficacy, a key barrier to physical activity suggested in social cognitive theory: the psychological and physical capacity to engage in the desired physical activity.

Figure 2:
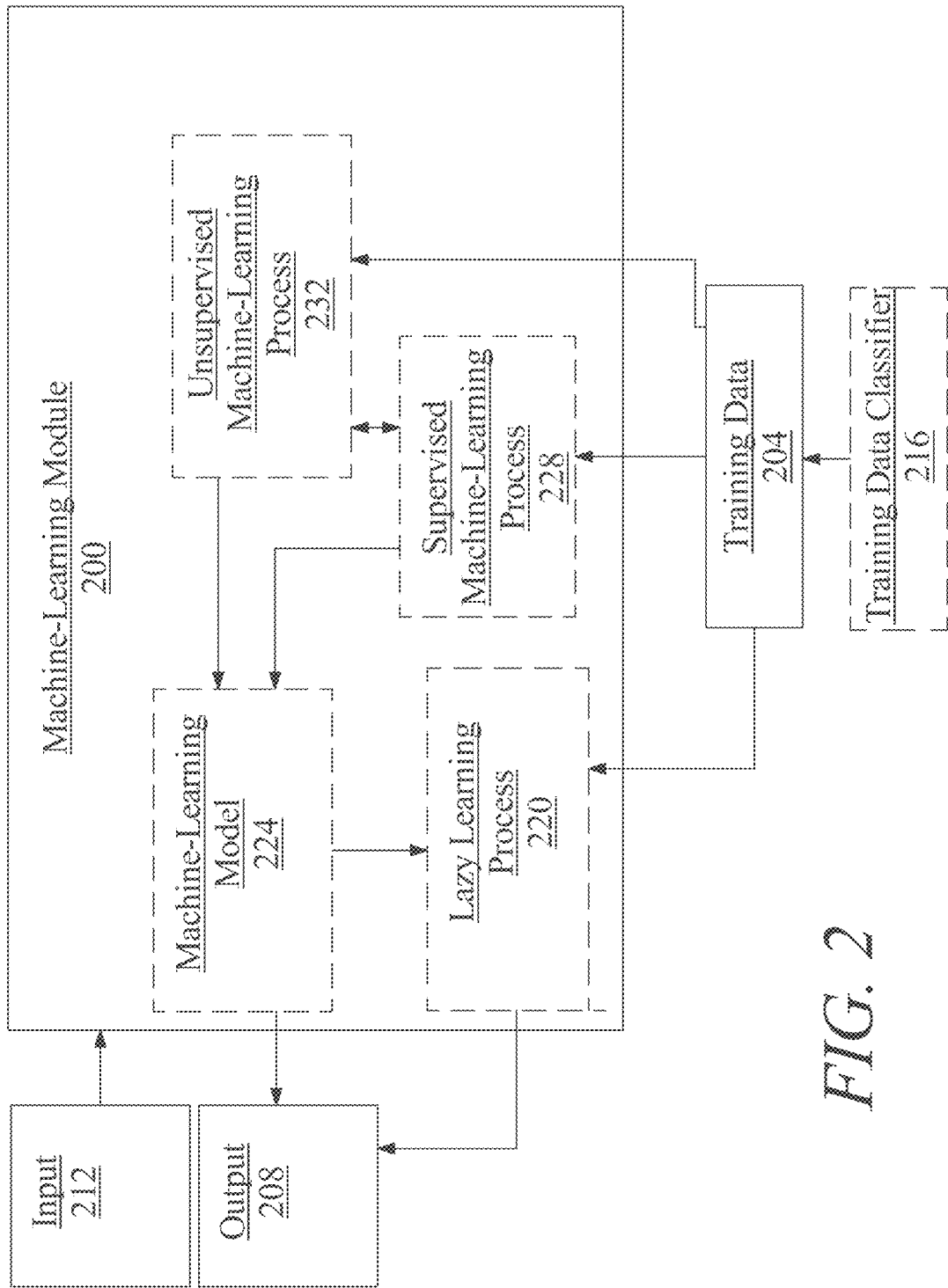
FIG. 2 is a block diagram illustrating an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device 104/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data 108 entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate inputs such as a plurality of activities of a plurality of data 108 and output at least an interrelation 116 or plurality of interrelations. Training data 204 used by machine-learning module 200 may further correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device 104 and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to skill levels, states of health, body types, ages demographics, or other characteristics of users, such that training data classified to a given cohort of users may be employed to generate data and/or data structures specific to that cohort.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
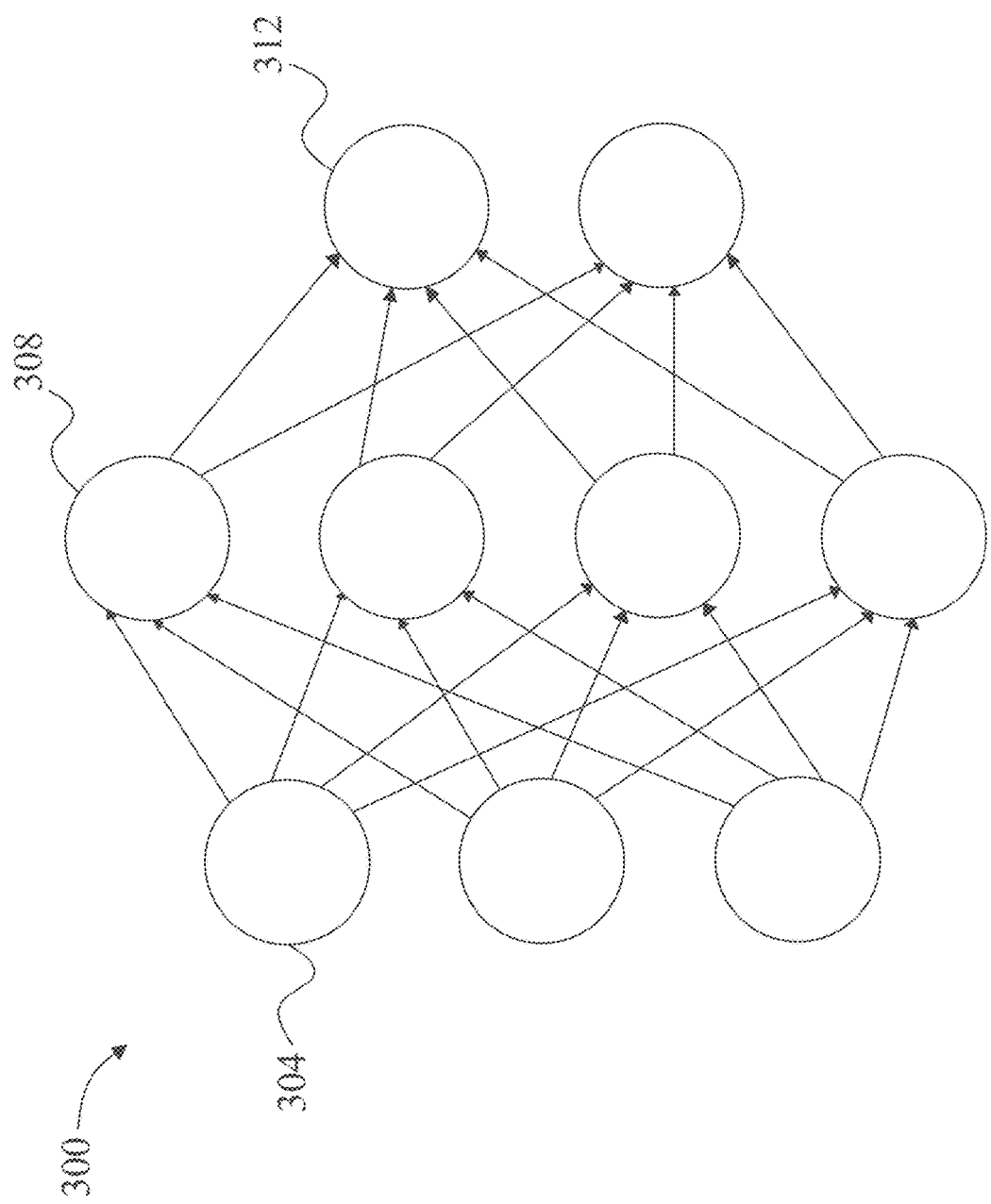
FIG. 3 is a schematic diagram illustrating an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Neural network 300 may include a feed-forward neural network. "Feed-forward neural network," for the purposes of this disclosure, refer to an artificial neural network wherein the interconnections between the nodes do not form a cycle. For instance, each node is different from its descendant which is a function of a recurrent neural network. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." In a non-limiting embodiment, neural network 300 may include an artificial neural network with representation learning and/or deep learning. In a non-limiting embodiment, neural network 300 may generate nodes representing at least a skill and/or common skill, interconnections or edges that connect a node to a different node that may represent at least a process and/or at least a path an individual can follow. For instance, a first node may represent a skill and a second node may represent an improved activity skill wherein the interconnection between the first node and second node represents a goal an individual may desire to achieve in which the individual may traverse through the interconnection as a function of an improvement activity skill to master and reach the second node further representing a goal skill. The generation of the neural network 300 and at least the nodes may include the use of a machine-learning model. Neural network 300 may include an artificial neural network. The edges or interconnections between nodes may represent a probability-weighted association between an input node and output node in which the association may be stored in a database. The database may include any database as described herein. A person of ordinary skill in the art after reviewing the entirety of this disclosure. would appreciate the representation of nodes for skills progress in the context of neural networks.

With continued reference to FIG. 3, neural network 300 includes at least an input node 304 from a plurality of nodes. At least an input node may represent an individual. At least an input node 304 may include a skill wherein the skill includes any skill described herein. At least an input node 304 may be included in an input layer. Input layer may be configured to collect input patterns including, but not limited to, a training data, a plurality of data, a plurality of activities, a plurality of common skills, and the like. In a non-limiting embodiment, at least an input node 304 may represent an elementary level skill. "Elementary level skill," for the purposes of this disclosure, refers to, but not limited to, an activity, a common skill, or the like, categorized for a beginner in the context of at least the skill. In a non-limiting, at least an input node 304 may represent a training data wherein the training data includes any training data described herein. Neural network 300 may be trained by at least the input node 300. At least an input node 304 may produce a signal representing the mastering of an improvement skill to a hidden node 308 or output node 312. Neural network 300 may include a bias node wherein the bias node may be configured for use in the creating of a successful machine-learning model or a skill representation graph 112.

With continued reference to FIG. 3, neural network 300 includes at least a hidden node 308 from a plurality of nodes. At least a hidden node 308 may include a skill, an exercise, an activity, or the like. At least a hidden node 308 may be included in a hidden layer. Neural network 300 may include a plurality of hidden layers. The hidden layer may be configured to act as an intermediate layer between an input layer and an output layer where at least the computing is performed in generating of subsequent skills as a representation of an outer node 312. The hidden layer may be configured to fine-tune a probability-weighting of the inputs until the neural network's 300 margin of error is minimal. In a non-limiting embodiment, the closer an individual's first skill level matches to the achieving of a subsequent skill representing a goal skill, the smaller the margin of error for neural network 300 will become. In a non-limiting embodiment, the hidden layer may incorporate a predictive measure in generating outputs from the input layer. In a non-limiting embodiment, at least a hidden node 308 may include a fine-tuned version of a first skill of at least an input node 304.

With continued reference to FIG. 3, neural network 300 includes at least an output node 312 from a plurality of nodes. At least an output node 312 may be included in an output later. The output layer may be configured to map an input pattern from the at least an input node 304 and/or at least a hidden node 308. Output layer may include at least a classification or signals to map at least the input pattern. At least an output node 312 may include a max level for a skill an individual may achieve. In a non-limiting embodiment, a skill from at least an output node 312 may include the last skill an individual may master to have achieved all varying levels of mastery of improvement activity skills. In a non-limiting embodiment, at least an output node 312 may represent a final goal skill in which no further goal skill exists from at least the output node 312.

Figure 4:
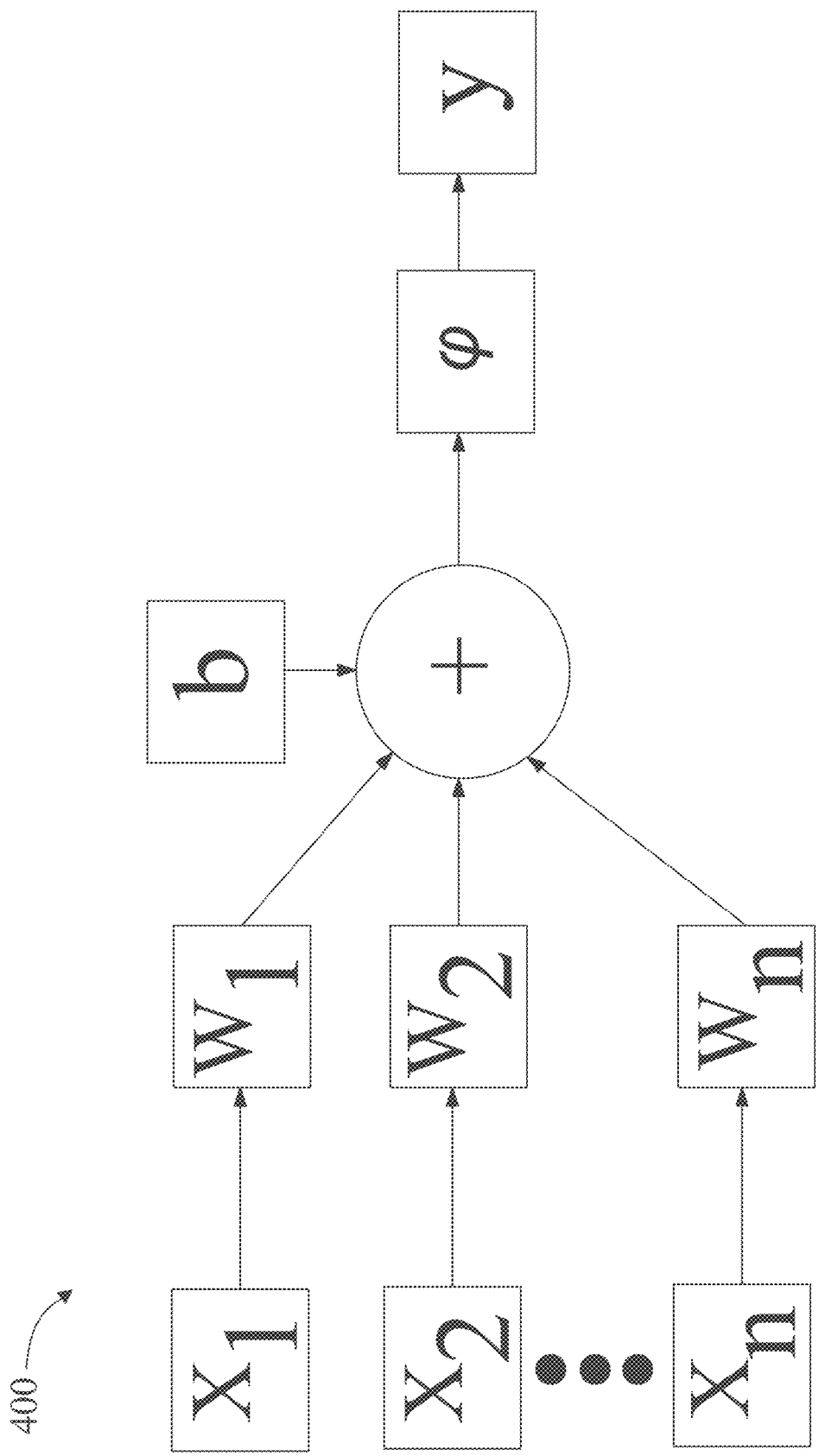
FIG. 4 is a schematic diagram illustrating an exemplary embodiment of a neural network node.

Referring now to FIG. 4, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

In embodiments, and referring now to FIG. 4, machine-learning and/or other methods may determine relationships between skills based on revealed comparative advantage (RCA) of each skill overexpressed in a participant, which may be calculated, without limitation, as follows:

$$rca(j, s) = \frac{\text{net}(j, s) \big/ \sum_{k' \in S} \text{net}(j, s')}{\sum_{j' \in J} \text{net}(j', s) \big/ \sum_{j' \in J, s' \in S} \text{net}(j', s')}$$

where j∈J is an endeavor, occupation, and/or pursuit in the set J of possible endeavors, occupations, and/or pursuits, and s∈S is a skill in a set S of possible skills, and net(j,s) is a function equal to 1 if skill s is essential to endeavor, occupation, and/or pursuit j and 0 if skill s is not essential to endeavor, occupation, and/or pursuit j. A weighted version of RCA (RCAW) may be calculated by suitably multiplying rca(j,s) values with some indicator of workout difficulty (either using absolute difficulty values or difficulty values converted to percentiles). Skill interrelations 116 between skills s and s' can therefore be mapped by the function, $$\theta(s, s') = \frac{\sum_{j \in J} e(j, s) \cdot e(j, s')}{\max\left(\sum_{j \in J} e(j, s), \sum_{j \in J} e(j, s')\right)}$$

where e(j,s) is 1 if rca(j,s)>$\Sigma_{j \in J}$rca(j,s)/|J| and is 0 otherwise; or alternatively using a weighted version eW(j,s) which is 1 if rcaw(j,s)>$\Sigma_{j \in J}$ rcaw(j,s)/|J|.

Still referring to FIG. 4, latent embeddings determined using a neural network may be determined using a metapath2vec algorithm. A metapath2vec algorithm, as used in this disclosure, determines embeddings by performing meta-path-based random walks in heterogenous networks. A person of ordinary skill in the art after reviewing the entirety of this disclosure would appreciate the algorithms performed in the determining of a neural network.

Figure 5:
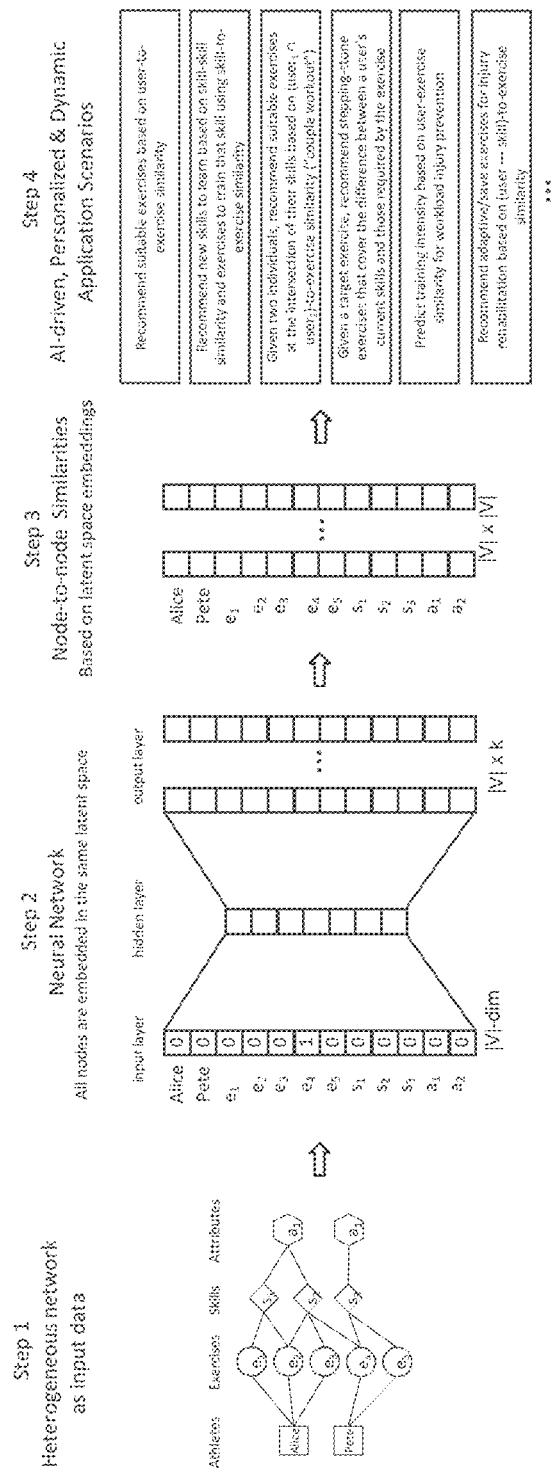
FIG. 5 illustrates an exemplary process for generation of embeddings and graphs as disclosed herein.

Referring now to FIG. 5, an illustrative example of a heterogeneous exercise network such as graph 112 and of neural network architectures for embedding this network in a latent space are depicted, along with and illustrative application scenarios based on node-to-node similarities. Neural network architectures may include any neural network described herein. Heterogenous exercise network may include a family of machine-learning methods, algorithms, and/or models wherein the machine-learning may include any machine-learning described herein. At Step 1, a heterogeneous exercise network as input data is illustrated. The heterogenous exercise network may include skill representation graph 112. Skill representation graph may include any skill representation graph as described herein. The heterogeneous network of Step 1 may include any nodes and interconnection as described herein. A person of ordinary skill in the art after reviewing the entirety of this disclosure would appreciate the details of the heterogenous network in the context of exercises.

With continued reference to FIG. 5, the heterogeneous network of Step 1 from the illustration may be inputted into a neural network at Step 2. The neural network may include any neural network described herein. In a non-limiting embodiment, the nodes of the heterogeneous network at Step 1 may be configured to be inputs in an input layer as input nodes. Input layer may include any input layer described herein. Input node may include any input node described herein. At Step 2, all nodes are embedded in the same latent space. In a non-limiting embodiment, at least each node from at least an input layer, at least a hidden layer, and at least an output layer, are hidden in the same space. In a non-limiting embodiment, the neural network at Step 2 may include hidden Markov models (HMM) or auto-encoders.

With continued reference to FIG. 5, the nodes from the output layer of neural network at Step 2 may perform a node-to-node similarity comparison based on latent space embeddings. Node-to-node similar may include comparing a set of nodes based on adjacent nodes or nodes they are connected to. For instance, two nodes are considered similar if they share many of the same neighbors. Node-to-node similarity may compute pair-wise similarities based on the Jaccard metric or Jaccard Similarity Score. The Jaccard similarity Score (sometimes called the Jaccard similarity index or coefficient) compares members for two sets to see which members are shared and which are distinct. It is also a statistic used for gauging the similarity and diversity of sample sets. It is a measure of similarity for the two sets of data, with a range from 0% to 100%. The higher the percentage, the more similar the two populations. Jaccard Similarity may be computed using the formula:

$$J(A, B) = \frac{|A \cap B|}{|A \cup B|} = \frac{|A \cap B|}{|A| + |B| - |A \cap B|}$$

The input of this algorithm is a bipartite, connected graph containing two disjoint node sets. Each relationship starts from a node in the first node set and ends at a node in the second node set. The Node Similarity algorithm compares each node that has outgoing relationships with each other such node. For every node n, we collect the outgoing neighborhood N(n) of that node, that is, all nodes m such that there is a relationship from n to m. For each pair n, m, the algorithm computes a similarity for that pair which is the Jaccard similarity of N(n) and N(m). The complexity of this comparison grows quadratically with the number of nodes to compare. The algorithm reduces the complexity by ignoring disconnected nodes. In addition to computational complexity, the memory requirement for producing results also scales roughly quadratically. In order to bound memory usage, the algorithm requires an explicit limit on the number of results to compute per node. This is the 'topK' parameter. It can be set to any value, except 0. The output of the algorithm are new relationships between pairs of the first node set. Similarity scores are expressed via relationship properties. In a non-limiting embodiment, the node similarity may be used to gauge similarity of differences of training data, a plurality of data, a plurality of activities, a plurality of exercises, a plurality of attributes, and the like as a function of at least an artificial intelligence to determine and/or recommend new skills for an individual to master. In a non-limiting embodiment, the node-to-node similarity may include a user-to-exercise similarity wherein exercise may include at least an activity. In a non-limiting embodiment, a node-to-node similarity may include a skill-to-skill similarity. In a non-limiting embodiment, a node-to-node similarity may include a skill-to-exercise similarity.

With continued reference to FIG. 5, Step 4 includes a method diagram of AI-driven personalized, and dynamic application scenarios. In a non-limiting embodiment, the neural network may recommend a suitable exercise or plurality of suitable exercises to an individual based on a user-to-exercise similarity. In a non-limiting embodiment, the artificial intelligence of a neural network may recommend at least a new skill based on a skill-to-skill similarity. In a non-limiting embodiment, the neural network may further recommend at least an exercise, wherein exercise may include a goal skill and/or skill improvement activity, using a skill-to-exercise similarity. At Step 4, a scenario may include two individuals and within a non-limiting embodiment, the neural network may recommend a plurality of suitable exercises at an intersection of each individual's skills based on the user-to-exercise similarity. In a non-limiting embodiment, the suitable exercise based on a skill-to-exercise similarity from two individuals may include a "couple workout." Couple workout may include at least an activity and/or exercise designed for a pair of individuals or a couple. A person of ordinary skill in the art after reviewing the entirety of this disclosure would appreciate a set of activities or exercises designed for a couple or pair.

With continued reference to FIG. 5, Step 4 may include a scenario that includes a neural network recommending a stepping-stone exercise given a target exercise that may cover the difference between an individual's current skills and those required by the exercise. In a non-limiting embodiment, stepping-stone exercises may include a higher intensity variation of a first or beginner level skill. For instance, stepping-stone exercise may include at least an activity that is designed to improve a user's current skill level. Step 4 may include a scenario wherein the step may predict a training intensity of an exercise and/or skill based on a user-to-exercise-similarity to prevent workload injury. In a non-limiting embodiment, the artificial intelligence may consider an injury rate and at least an individual's risk of sustaining an injury from training a skill and determine a suitable exercise or activity to train an individual skill and minimize workload injury the individual may sustain from training the skill. In a non-limiting embodiment, the training intensity prediction may be determined as a function of a machine-learning embodiment and may include a plurality of data, a plurality of activities, an individual skill level, a relative skill level, and/or an individual's health status and output a skill improvement activity based on at least an input. Step 4 may include a scenario wherein the step may recommend an adaptive or save exercise configured to rehabilitate an injury based on a user-to-exercise similarity or user-to-skill similarity. In a non-limiting embodiment the adaptive or save exercise may include an exercise that may still improve an individual skill level while considering the rehabilitation of an injury sustained by the individual. A person of ordinary skill in the art would after reviewing the entirety of this disclosure would appreciate an injury rehabilitation exercise in the context of improving skill.

Figure 6:
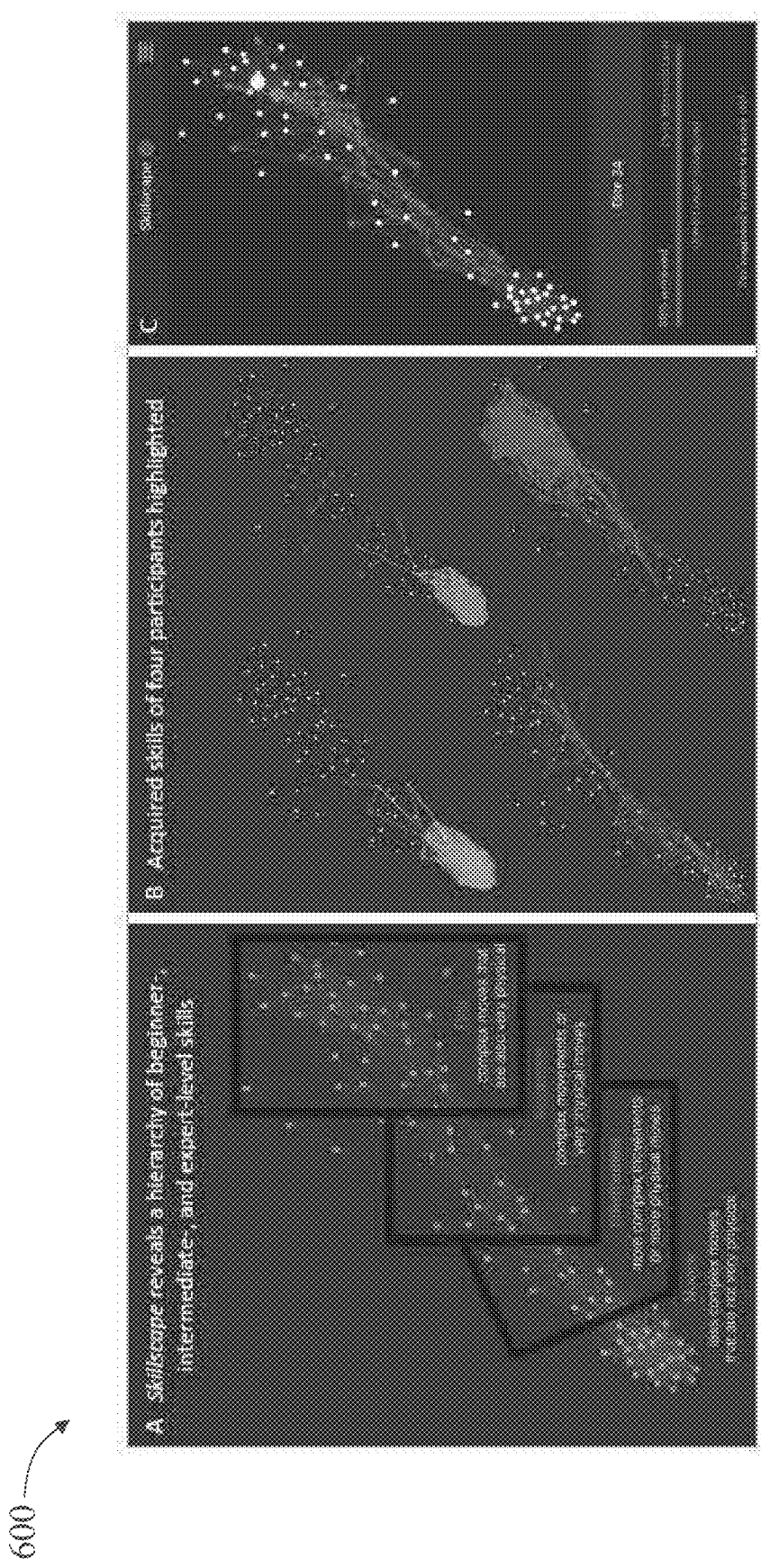
FIG. 6 illustrates exemplary embodiments of graphs as described herein.

Referring now to FIG. 6, an exemplary embodiment of a process for derivation of the skill representation graph 112 is illustrated. A skill representation graph 112 resulting from the depicted process may include a threshold set to a minimum skill similarity based on backbone-extraction and displayed using a force directed layout. Spatial closeness may correspond to similarity (synergy) between skills. Such clustering may visibly reveal a hierarchy of four levels of complementary skills corresponding to novice, intermediate, advanced, and expert levels, which may be depicted using colors based on community structure recovered by Louvain clustering. Highlighting acquired skills of four example participants on the skill representation graph 112. B1 represents an exemplary beginner male participant. B2 represents an exemplary intermediate male participant. B3 represents an exemplary intermediate female participant. B4 represents an exemplary elite male participant. On the right, is an exemplary embodiment in a prototype smartphone app, highlighting skills acquired by an elite-level participant. A large white node shows most relevant skill (i.e., skill with highest level of synergy) a subject participant does not currently have to support setting goals for continuous improvement. The bottom illustrates progress goal achievement and recommended exercises to work toward goal achievement.

Figure 7:
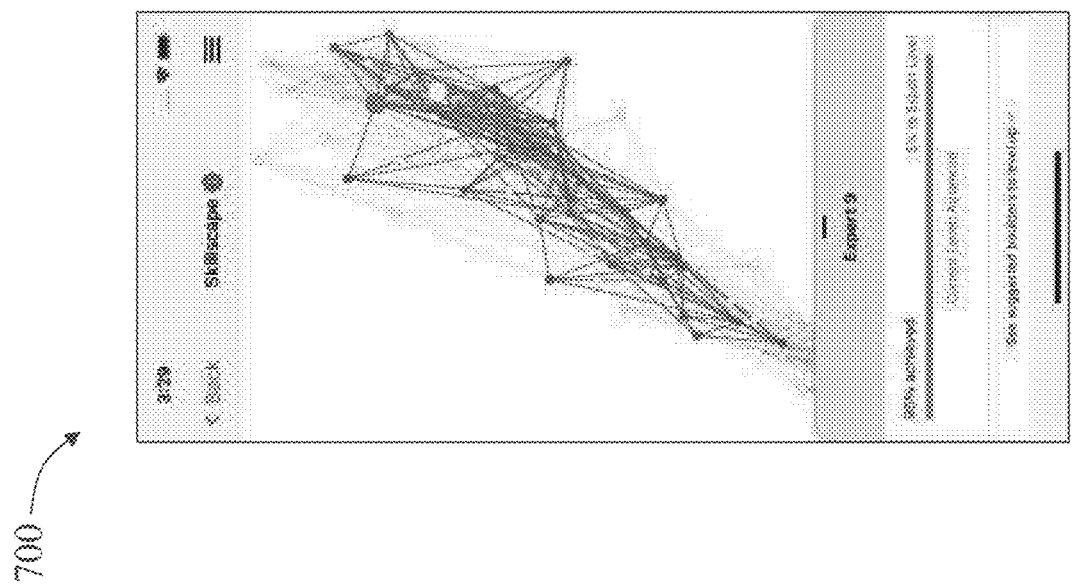
FIG. 7 illustrates an exemplary embodiment of a display as described herein.

Referring now to FIG. 7, an exemplary embodiment of a user device which may include a display as described in this disclosure is provided. User device may include any user device described herein. Display may be configured to support the displaying of a skill representation graph. The skill representation graph 112 that is displayed may include various highlights with various colors and/or sizes configured to inform an individual a visual representation of suitable training goals. In a non-limiting embodiment, a graph may include red highlights and enlarged nodes to inform an individual of suitable training goals that the individual may follow. In a non-limiting embodiment, a smaller sized node may represent skills that an individual has completed or acquired. The display may include the graph to include a grey scale graph landscape indicating skills that may embed meaning. In a non-limiting embodiment, the grey scale graph landscape may include non-required skills or activities that are unrelated to an individual's given training. In a non-limiting embodiment, an individual may decide to off course of a training indicated by a skill representation graph 112 and follow a different path within the grey scale graph landscape in which the computing device may generate a new suitable training and display a new skill representation graph based on the individual's deviation from the original suitable training. The display may include a progress bar that includes a percentage indicating a user's progress in completing an achievement of a skill or suitable training. In a non-limiting embodiment, the progress bar may facilitate self-monitoring. In a non-limiting embodiment, the progress bar may include a remaining progress bar that indicates the remaining distance the progress bar must complete to achieve a next level representing a subsequent skill or higher intensity activity for the subsequent skill. The display may further be configured to display an individual's individual skill level which may include a current individual skill level. The display may further be configured to display a title or name of a skill, exercise, or activity. The display may include a list that includes a plurality of targeted exercises for a skill improvement activity to improve a current skill or complete a current achievement. In a non-limiting embodiment, the display may include a drop down menu and/or list displaying a set of activities or exercises in a vertical or horizontal chronological manner a user may follow. A person of ordinary skill in the art after reviewing the entirety of this disclosure would appreciate a secondary set of exercises in the context of improving skill.

With continued reference to FIG. 7, the display may be used, without limitation, to indicate progress and/or goals to a user, or to share information about skill achievements within a social network to harness effects of further social influence, for instance and without limitation for the purposes of motivation, social comparison, or the like. In an embodiment, a mobile application or other software element providing a display may generate a "Friends Feed" feature which may function as and/or contribute to social network that accepts and displays regular updates; participants may be able to follow other participants, and see information about their completed exercises and their achievements. Updates may, for instance, link to or share one or more elements of display as illustrated, including a current state of a skill representation graph 112 corresponding to a sharing participant, progress toward the participant's goal, distance from goal achievement currently enjoyed by the participant, a listing of exercises to be completed, or the like. Any or all of display and/or any graphic, datum, data structure, or the like described herein may be shared and/or withheld from sharing; a participant may be able to choose which element and/or which block of elements to share. A person of ordinary skill in the art would appreciate a user device configured to share elements with other individuals in a social context.

Figure 8:
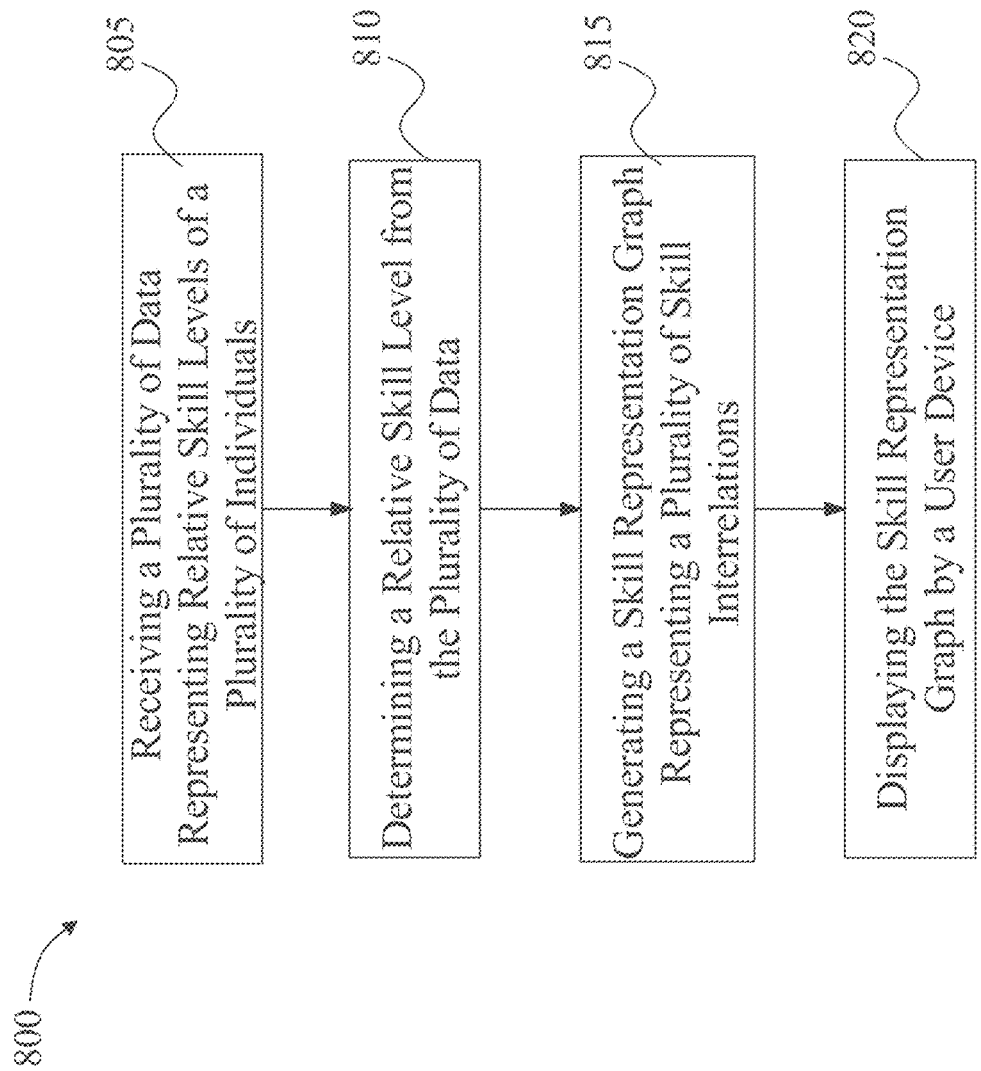
FIG. 8 is a flow diagram illustrating an exemplary embodiment of a method of generation and traversal of a skill representation graph using machine learning.

Referring now to FIG. 8, an exemplary embodiment of a method 800 of generation and traversal of a skill representation graph 112 using neural networks is illustrated. Method 800 includes step 805 which includes receiving a plurality of data representing relative skill levels of a plurality of a plurality of individuals. At step 805, a computing device 104 is configured to receive a plurality of data 108 from a plurality of individuals. Receiving the plurality of data 108 may include receiving a plurality of activities or a plurality of common skills. Receiving the plurality of data 108 may include corresponding each individual from a plurality of individuals to a common skill of a plurality of common skills. The plurality of data 108 may include any plurality of data described herein. The common skill may include any common skill as described herein. In a non-limiting embodiment, receiving the plurality of data 108 may be performed by a sensor, other computing device, wearable computer, or the combination thereof. The sensor may include any sensor described herein. Step 800 may include describing at least an activity of an individual performing at least one common skill. Step 800 may include a plurality of activities describing a common skill of the plurality of common skills. Receiving of the plurality of data may further comprise corresponding each individual of the plurality of individual to at least a common skill of the plurality of common skills.

With continued reference to FIG. 8, method 800 includes step 810 which includes determining a relative skill level 124 from the plurality of data 108. Step 810 may include determining the relative skill level 124 to determine at least an individual skill level as a function of an individual performing at least one common skill. Determining the relative skill level 124 may further include identifying at least a goal skill of the plurality of common skills as a function of the at least one individual skill level. Goal skill may include any goal skill 128 as described in the entirety of this disclosure. Determining the relative skill level 124 may further determine at least a skill improvement activity 132 for an individual to achieve at least a goal skill 128. Skill improvement activity 132 may include any skill improvement activity as described herein.

With continued reference to FIG. 8, method 800 may include step 815 which includes generating a skill representation graph 112. The skill representation graph 112 may include any skill representation graph as described in the entirety of this disclosure. Step 815 may include generating a graph representing a plurality of skill interrelations 116. Skill interrelation 116 may include any skill interrelation as described in the entirety of this disclosure. Generating of the skill representation graph of method 815 may further comprise using a machine-learning model to generate a plurality of interrelations comprises a configuration of a neural network. Generating of the plurality of interrelations may further include the use of at least a revealed comparative advantage. Step 815 may include generating a plurality of nodes. The nodes may represent, but not limited to, a skill, an individual, an attribute, or the like. Nodes may include any nodes as described herein. Step 815 may further include generating a plurality of interconnections wherein each interconnection represents a process and/or path to master a subsequent skill of a first skill for an individual. Interconnection may include any interconnection as described herein.

With continued reference to FIG. 8, method 800 may include step 820 which includes displaying the skill representation graph 112 by a user device 136. User device may include any user device as described herein. Step 820 may include displaying at least an indicia indicating a user's current state of progress of at least an improvement activity in achieving at least a goal skill 128. A person of ordinary skill in the art after reviewing the entirety of this disclosure would appreciate the various embodiments of displaying a skill representation graph 112 in the context of a user device or display.

Figure 9:
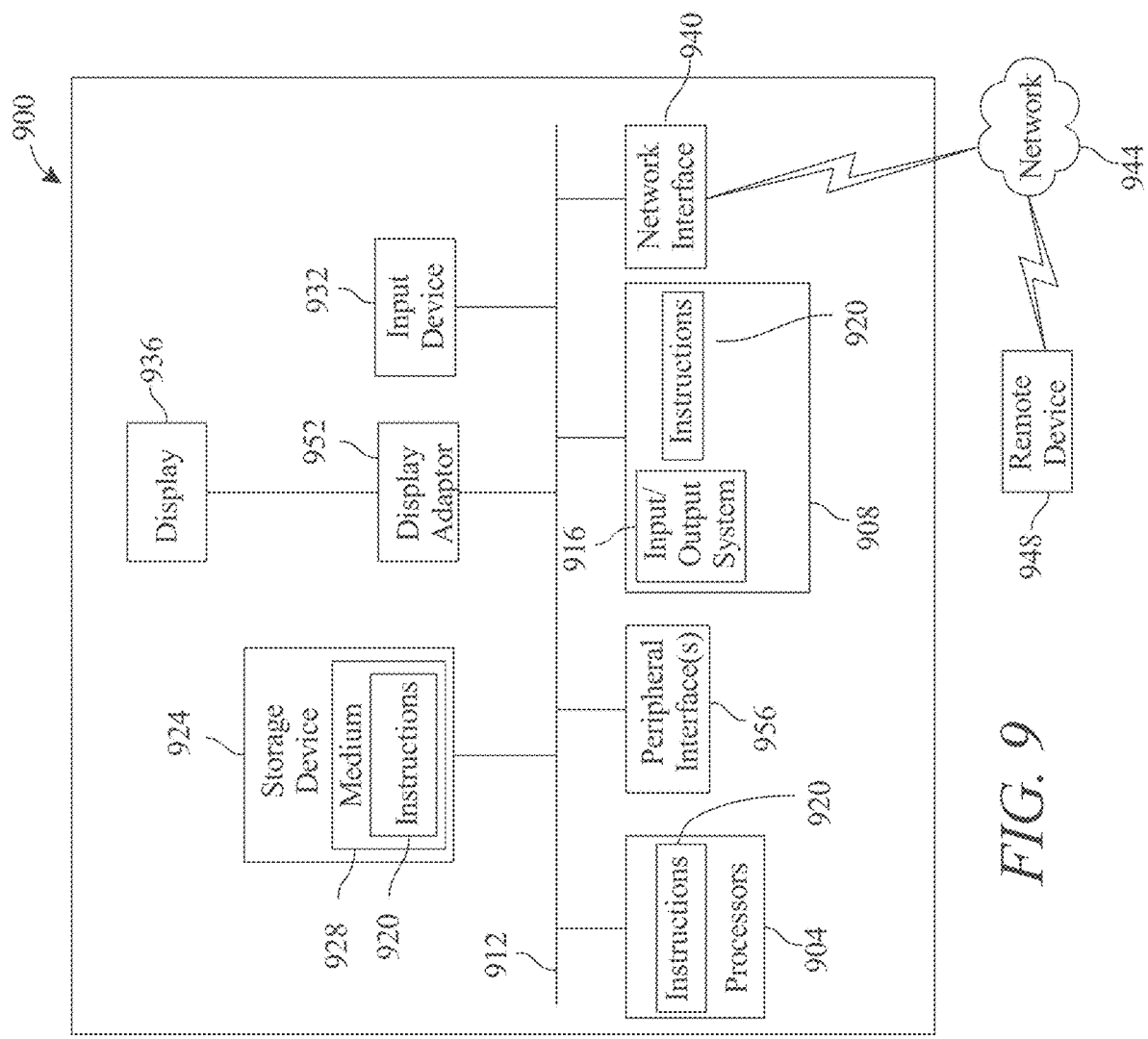
FIG. 9 is a block diagram of a computing system that can be used to implement any one or more of the methodologies disclosed herein and any one or more portions thereof.

Referring now to FIG. 9, an exemplary embodiment of a system 900 for the generation and traversal of a skill representation graph using neural networks is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 9, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generation and traversal of a skill representation graph using machine learning, the system comprising:
   a computing device, the computing device configured to:
   receive a plurality of data of a plurality of individuals, wherein the plurality of data comprises a plurality of individual skill levels corresponding to a common skill of a plurality of common skills, and wherein the plurality of data combines a dynamic network of users who train together and a training history for each user;
   determine a relative skill level of the plurality of individuals from the plurality of data, wherein the relative skill level includes an achievement level determined by:
   calculating a mean difficulty per individual per skill of the plurality of data of the plurality of individuals; and
   calculating the achievement level as a percentile of the mean difficulty, among all individuals and the relative skill;
   generate a skill representation graph representing a plurality of skill interrelations, each interrelation of the plurality of skill interrelations representing a degree of difficulty in acquiring a second skill after acquiring a first skill, as a function of the relative skill level, wherein generating the graph further comprises:
   generating a plurality of nodes wherein each node represents a skill;
   generating a plurality of interconnections wherein each interconnection represents a process and/or path to master a subsequent skill of a first skill;
   generating the plurality of interrelations as a function of the at least a plurality of data and a neural network, wherein generating the plurality of interrelations further comprises:
   training, using the plurality of data, the neural network to output a plurality of embeddings representing skills associated with nodes, wherein the neural network further comprises:
   an input layer;
   at least a hidden layer; and
   an output layer, the output layer configured to:
   compare pairs of adjacent nodes to at least a threshold according to a pairwise similarity test; and
   remove interconnections, of the plurality of interconnections, between pairs where the similarity test does not meet the threshold;
   outputting, using the neural network and the plurality of nodes, the plurality of embeddings;
   determining a plurality of distances between the plurality of embeddings using a distance measure; and
   generating the plurality of interrelations as a function of the plurality of distances; and
   assembling the graph using the plurality of interrelations, wherein assembling the graph further comprises:
   representing the plurality of interconnections as edges between the plurality of nodes representing skills; and
   representing distances between embeddings corresponding to pairs of connected skills as lengths of edges connecting corresponding nodes;
   determine at least a goal skill of the plurality of common skills by recommending to the user a third skill and a fourth skill;
   wherein the third skill is determined as a function of which skills the user has acquired, which skills are interconnected to at least one skill the user has acquired, and which skills have higher average difficulty than the average difficulty of all skills the user has acquired;
   wherein the fourth skill is determined as a function of a lowest achievement level of a skill of the user; and
   determine at least one improvement activity to achieve the at least a goal skill; and a user device, wherein the user device is configured to:
  display the skill representation graph and at least one indicia of the user's current state of progress of an improvement activity in achieving the at least a goal skill as a function of the computing device.

2. The system of claim 1, wherein the plurality of data further comprises a description of at least an activity of an individual performing at least one common skill.

3. The system of claim 1, wherein the plurality of data further comprises a plurality of activities describing a common skill of the plurality of common skills.

4. The system of claim 1, wherein the relative skill level comprises a determination of at least an individual skill level as a function of an individual performing at least one common skill.

5. The system of claim 1, wherein the relative skill level further comprises the at least a goal skill of a common skill of the plurality of common skills as a function of the at least an individual skill level.

6. The system of claim 5, wherein the relative skill level further comprises at least a skill improvement activity for an individual to achieve the at least a goal skill.

7. The system of claim 1, wherein generating the plurality of interrelations comprises a configuration of the neural network.

8. The system of claim 1, wherein the generation of the plurality of interrelations comprises the use of at least a revealed comparative advantage.

9. A method for generation and traversal of a skill representation graph using machine learning, the method comprising:
  receiving, by a computing device, a plurality of data of a plurality of individuals wherein the plurality of data comprises a plurality of individual skill levels corresponding to a common skill of a plurality of common skills and wherein the plurality of data combines a dynamic network of users who train together and a training history for each user;
  determining a relative skill level of the plurality of individuals from the plurality of data, wherein the relative skill level includes an achievement level determined by:
    calculating a mean difficulty per individual per skill of the plurality of data of the plurality of individuals; and
    calculating the achievement level as a percentile of the mean difficulty, among all individuals and the relative skill;
  generating a skill representation graph representing a plurality of skill interrelations, each interrelation of the plurality of skill interrelations representing a degree of difficulty in acquiring a second skill after acquiring a first skill, as a function of the relative skill level, wherein generating the graph further comprises:
    generating a plurality of nodes wherein each node represents a skill;
    generating a plurality of interconnections wherein each interconnection represents a process and/or path to master a subsequent skill of a first skill;
    generating the plurality of interrelations as a function of the at least a plurality of data and a neural network, wherein generating the plurality of interrelations further comprises:
      training, using the plurality of data, the neural network to output a plurality of embeddings representing skills associated with nodes, wherein the neural network further comprises:
        an input layer;
        at least a hidden layer; and
        an output layer, the output layer configured to:
          compare pairs of adjacent nodes to at least a threshold according to a pairwise similarity test; and
          remove interconnections, of the plurality of interconnections, between pairs where the similarity test does not meet the threshold;
      outputting, using the neural network and the plurality of nodes, the plurality of embeddings;
      determining a plurality of distances between the plurality of embeddings using a distance measure; and
      generating the plurality of interrelation s as a function of the plurality of distances; and
    assembling the graph using the plurality of interrelations, wherein assembling the graph further comprises:
      representing the plurality of interconnections as edges between the plurality of nodes representing skills; and
      representing distances between embeddings corresponding to pairs of connected skills as lengths of edges connecting corresponding nodes;
    determining at least a goal skill of the plurality of common skills by recommending to a user a third skill and a fourth skill;
      wherein the third skill is determined as a function of which skills the user has acquired, which skills are interconnected to at least one skill the user has acquired, and which skills have higher average difficulty than the average difficulty of all skills the user has acquired;
      wherein the fourth skill is determined as a function of a lowest achievement level of a skill of the user; and
    determining at least one improvement activity to achieve the at least a goal skill; and
  displaying, at a user device, the skill representation graph and at least one indicia of the user's current state of progress of an improvement activity in achieving the at least a goal skill as a function of the computing device.

10. The method of claim 9, wherein receiving of the plurality of data further comprises describing at least an activity of an individual performing at least one common skill.

11. The method of claim 9, wherein receiving of the plurality of data further comprises a plurality of activities describing a common skill of the plurality of common skills.

12. The method of claim 9, wherein determining the relative skill level comprises determining at least an individual skill level as a function of an individual performing at least one common skill.

13. The method of claim 9, wherein determining the relative skill level further comprises identifying the at least a goal skill of the plurality of common skills as a function of the at least one individual skill level.

14. The method of claim 13, wherein determining the relative skill level further comprises determining at least a skill improvement activity for an individual to achieve the at least a goal skill.

15. The method of claim 9, wherein the generating of the skill representation graph further comprises generating the plurality of interrelations using a configuration of the neural network.

16. The method of claim 9, wherein the generating of the plurality of interrelations comprises the use of at least a revealed comparative advantage.

\* \* \* \* \*